United States Patent [19]

Schade et al.

[11] 4,452,853

[45] Jun. 5, 1984

[54] POLYETHER ESTERS FOR THE CEMENTING OF TEXTILES

[75] Inventors: Gerhard Schade, Witten; Peter Uckert, St. Augustin, both of Fed. Rep. of Germany

[73] Assignee: Dynamit Nobel AG, Cologne, Fed. Rep. of Germany

[21] Appl. No.: 405,654

[22] Filed: Aug. 5, 1982

[30] Foreign Application Priority Data

Aug. 13, 1981 [DE] Fed. Rep. of Germany ....... 3132059

[51] Int. Cl.³ .................................. C08G 63/66
[52] U.S. Cl. ............................ 528/301; 528/300; 528/302; 528/305; 528/308.6; 528/308.7
[58] Field of Search .............. 528/300, 301, 302, 305, 528/308.6, 308.7

[56] References Cited

U.S. PATENT DOCUMENTS

| | | | |
|---|---|---|---|
| 3,864,315 | 2/1975 | Ohno et al. | 528/302 X |
| 4,062,907 | 12/1977 | Sublett | 528/301 X |
| 4,094,721 | 6/1978 | Sturm et al. | 528/308.7 X |
| 4,154,918 | 5/1979 | Buxbaum et al. | 528/300 X |
| 4,156,774 | 5/1979 | Buxbaum et al. | 528/300 X |
| 4,321,341 | 3/1982 | Neuberg et al. | 528/300 X |
| 4,328,333 | 5/1982 | Barbee et al. | 528/305 X |

*Primary Examiner*—Lucille M. Phynes
*Attorney, Agent, or Firm*—Felfe & Lynch

[57] ABSTRACT

A polyether ester having a melting point of 95° to 125° C. based on 1,4-butanediol, terephthalic acid and isophthalic acid in a molar ratio of 48 to 55:52 to 45 and a content of 10.5 to 25 wt % of polyethylene glycol with a molar mass of 0.4 to 6 kg/mol is presented as a suitable fusion adhesive for textiles. The bonds prove to be resistant to hot water and perchloroethylene.

6 Claims, No Drawings

POLYETHER ESTERS FOR THE CEMENTING OF TEXTILES

This invention relates to polyether esters for the cementing of textiles.

More particularly the polyether esters of the invention are based on terephthalic acid, isophthalic acid, 1,4-butanediol and a polyalkylene ether diol, and have a melting point of 95° to 125° C., and a relative viscosity, measured at 25° C. on one gram of polyester in 100 ml of a mixture of 60 weight-parts of phenol and 40 weight-parts of 1,1,2,2-tetrachloroethane, of 1.85 to 2.20.

For the cementing of textile substrates, such as for example cementing interfacing to face materials to achieve a stiffening effect, polymers are used which usually are in finely divided, powder form and are distributed in a regular pattern over the inner side of one of the fabrics to be joined together, and then are partially melted by heat and thus "sintered" in place (so as to leave the fabrics manageable); afterwards heat and pressure are applied simultaneously to the facing material in ironing presses to cement the two fabrics together.

A number of different mixed polyesters have been proposed as polymers for use as textile iron-on adhesive powders. These polyesters are insufficiently resistant to the action of organic solvents such as those used in the chemical cleaning of textiles, when the polyesters contain exclusively moieties of low molecular weight dicarboxylic acids and dialcohols. Polyesters of such composition and their use as textile adhesives are variously described (U.S. Pat. No. 3,669,921, German OS No. 1,920,432, U.S. Pat. No. 3,948,856, and German OS No. 3,037,100 and OS No. 2,435,863 etc.). These polyesters are used mainly with textiles which are usually cleaned only by laundering, that is, for example, for the stiffening of shirt collars, cuffs, blouses and the like. For the cementing of textiles for resistance to both laundering and dry cleaning, the use of block copolyether esters has been proposed. For example, a polyether ester has been recommended as a textile adhesive (Japanese OS No. 54-153,835) which contains, condensed together, (a) 70–40 mol % of terephthalic acid moieties, (b) 30–60 mol % of isophthalic acid moieties, (c) 1,4-butanediol moieties, and (d) 1 to 10% of the total weight of the foregoing substances of a polyalkylene ether diol having a molar mass of 0.3 to 6 kg per mol; component (d) includes polyethylene glycol, even though polytetramethylene glycol is preferred. Such polyesters, due to the low concentration of component (d), have a comparatively high melt viscosity, so that relatively high ironing temperatures and/or long ironing times or high ironing pressures are needed for the production of the adhesive bonds, and the more heat-sensitive fabrics can be damaged thereby, under certain circumstances.

It has also been proposed to retain components (a) to (c) and to increase the concentration of component (d) to 10 to 33 weight-percent (reckoned as above), component (d) being a moiety of polytetramethylene glycol of the molar masses 0.6 to 1.3 kg/mol (German OS No. 2,705,270). The exclusive use of polytetramethylene glycol when elevated concentrations of component (d) are used is due to the fact that polyethylene glycol in elevated concentrations increases the sensitivity of such block polyesters to water and impairs the launderability of the textile bonds made therewith. Thus it is stated, in German OS No. 2,451,369 for example, in connection with mixtures of block polyester esters with dianhydrides and their use in the cementing of slick-surfaced materials, that long-chain polyalkylene ether diols having a molar ratio of carbon to oxygen of more that about 2.5:1, which are to be incorporated as softening segments, yielded block polyesters which are less moisture absorbent and more resistant to hydrolysis. Therefore, if the criterion of low sensitivity to moisture is an important one for a particular application, as it is in the case of a textile adhesive polyester, it was best not to use polyethylene glycol, unless it is used in low concentrations (Japanese OS No. 54-153,835).

The polyesters of the invention have an "open time" of only 5 to 10 seconds. If within the range of the polyester compositions of the invention the ratio of terephthalic acid to isophthalic acid is selected such that the "open time", in the case of a trephthalic acid to isophthalic acid ratio of 45-40 to 55-60, approaches 15 seconds (German OS No. 2,629,102), textile adhesives made from such polyesters prove to have very poor resistance to dry cleaning and thus are useless for the desired purpose.

Polyesters of the kind involved in the invention, which do not, however, have the composition specified in the invention, yield substantially amorphous products which do not crystallize during the cooling process (German OS No. 2,264,303). They are not resistant to chemical cleaning and therefore they cannot be used for the application in accordance with the invention.

THE INVENTION

It is the object of the invention to make available polyether esters of high molecular weight which will completely satisfy practical requirements in regard to resistance of the textile bonds made therewith both to chemical cleaning and to laundering, and which will be economical to manufacture.

The subject matter of the invention is polyether esters of the kind designated above, in accordance with the specific part of the principal claim.

The polyether esters of the invention have the advantage that they can be ironed at low temperatures and/or for a very brief period of time, since the elevated concentration of polyethylene ether diol that is to be incorporated by condensation makes their melt viscosity substantially lower.

The preferred molar ratio of terephthalic and isophthalic acid of approximately 50:50 yields as a polycondensate with only 1,4-butanediol, polyesters having a melting point of approximately 125° C., and with rates and degrees of crystallization that have been found to be desirable. If, setting out from this, the terephthalic acid content is increased at the expense of the isophthalic acid content, the melting point is raised, thereby making the adhesive less easy to set by ironing. If the composition is changed in the opposite sense, the crystallizability is soon affected to such an extent that resistance to dry cleaning is substantially lost when polyethylene glycol is additionally incorporated by condensation into the adhesive.

The presence of residues of polyethylene glycol has little effect on the rate and degree of the crystallization of the polyester modified therewith. If the proportion of polyethylene glycol in the polyester is kept constant by weight, the melting point is lowered as the molar mass of the polyethylene glycol is lowered, in a known manner. If very low melting points are desired to permit the cementing of very heat-sensitive fabrics, lesser amounts of other polyalkylene ether diols, such as diethylene glycol and/or triethylene glycol can be used instead of polyethylene glycol; however, not more than about 10% by weight of polyethylene glycol moieties should be replaced by moieties of low molecular weight ethylene ether diols of this kind, since these greatly reduce the crystallizability of the polyesters and thus impair resistance to chemical cleaning and/or laundering in the adhesive compounds prepared therefrom.

The polyesters are to have relative viscosities of at least 1.85, preferably of at least 1.90, as measured on 100 ml solutions containing one gram of polymer, the measurement being performed with an Ubbelohde viscosimeter at 25° C. At low relative viscosity values ($\eta$ rel), an undesirably low adhesive strength is often found in the cements, either before or not until after laundering and/or dry cleaning. Higher $\eta$ rel values, on the other hand, result in unnecessarily high melt viscosities, making the wetting of the textile fibers difficult, and accordingly comparatively long adhering times and/or high cementing temperatures have to be accepted. Therefore, desirable values of $\eta$ rel are around approximately 1.90 to 2.20, the range between 1.95 and 2.05 being especially preferred.

Polyethylene glycol gives to the polyether esters made from it an especially high sensitivity to thermal oxidation, and therefore stabilizers are to be used in the preparation of the polyether esters (H. Zimmermann, K. Dietrich, Acta Polym. 1979, 30 (4) 199–203).

In practice, other additives, such as nucleating agents, e.g., microtalc, antistatics, lubricants, waxes or the like are used as grinding adjuvants, etc., by adding them to the polyether ester melts or during or after the grinding of the polyether esters.

The preparation of the polyether esters is performed basically according to conventional methods of melt condensation. A typical polyether ester of the invention has been prepared as follows:

9.7 kg of dimethylterephthalate (50 mol), 10.8 kg of 1,4-butanediol (120 mol), 2.7 kg of polyethylene glycol (corresponding to 11% weight % of the produced polyester), 25 g of tetrabutyltitanate, and 43 g of 2-ethylhexandediol-1,2 were placed in a 40-liter reactor of stainless steel.

After purging the air with nitrogen, the mixture was heated at standard pressure; at an internal temperature of 120°–130° C., the stirrer was turned on, and 3.1 liters of distillate (substantially methanol) were removed at a column head temperature of 62°–67° C., until a final temperature of 180° C. was reached. By bypassing the column an additional 0.7 liter of distillate was obtained. Then the reactor was cooled to 160° C., 8.7 kg of isophthalic acid (50 mol) was added against a strong stream of nitrogen, the temperature was adjusted to 190° to 200° C. and 2 liters of distillate (substantially water) was driven off through the column. Then 13.5 g of Irganox 1010 ® was added, the temperature was raised to 240°–245° C., and at the same time a vacuum was applied. At 245° C. and a pressure of less than $1.33 \times 10^{-3}$, the mixture was stirred until the increase in the resistance to stirring reached a predetermined, empirically established value. Then the vacuum was relieved with nitrogen, the melt was let out and allowed to cool, and crushed.

The granules thus obtained were ground while frozen with liquid nitrogen, the grain size fraction of 80 to 200 microns was sifted out and applied in dots through a regularly perforated plate to a cotton interfacing material, such that a weight of 21 g was applied per square meter, and the powder dots were partially fused by brief heating of an aluminum support underneath the fabric (approx. 10–15 s, 160° C.). A facing material made of a polyester-cotton mixture was pressed against the interfacing material thus prepared, using an ironing press at a pressure of 0.3 bar and a temperature of 160° C., for a period of 20 seconds. The textile sandwich thus created was cut into strips 5 cm wide and the resistance to pulling apart was tested before and after one hour of immersion in perchlorethylene ("per") in the one case and after one or more launderings at 60° C. The results obtained are given for the examples in the following tabulation.

| Example | T/I/BD (mol %) + PEG | PEG wt-% | PEG kg/mol | $\eta$ rel. | $T_m$ °C. |
|---|---|---|---|---|---|
| 1 | 50/50/100 | 11 | 0.4 | 1.90 | 120 |
| 2 | " | 15 | 0.4 | 1.95 | 118 |
| 3 | " | 20 | 0.4 | 1.98 | 115 |
| 4 | " | 11 | 1.55 | 1.90 | 123 |
| 5 | " | 11 | 4.0 | 1.95 | 124 |
| 6 | " | 25 | 4.0 | 2.10 | 123 |
| 7 | " | 11 | 6.0 | 1.98 | 120 |
| 8 | " | 20 | 6.0 | 2.10 | 117 |
| 9 | " | 25 | 6.0 | 2.14 | 115 |
| 10 | " | 20 + 2 TEG | 0.4 | 2.05 | 105 |

In the above table, T, I and BD represent moieties of terephthalic acid, isophthalic acid and 1,4-butanediol, PEG represents moieties of polyethylene glycol and kg/mol represents their molar mass, $\eta$ rel. represents the relative viscosity, $T_m$ the melting point of the polyester (melt maximum, obtained by differential thermocalorimetry) and TEG represents moieties of triethylene glycol.

In the polyether esters of the table above polyethylene glycol, respectively in example 10 also triethylene glycol (TEG) and 1,4-butanediol in all examples form 100 mol % of the diol component.

| | | [N/5 cm] | | | |
|---|---|---|---|---|---|
| | Adhesion | After immersion in "per" | | After laundering at 60° C. | |
| Example | At start | 1 × | 5 × | 1 × | 5 × |
| 1 | 30 | 28.5 | 28 | 30 | 29 |
| 2 | 49 | 43 | 40 | 42 | 42 |
| 3 | 52 | 48 | 46 | 47 | 45 |
| 4 | 30 | 28.4 | 28 | 29 | 29 |
| 5 | 31.5 | 30 | 29 | 30.5 | 30 |
| 6 | 40 | 37 | 38 | 35 | 35 |
| 7 | 33.3 | 28 | 29 | — | — |
| 8 | 41.8 | 35 | 36 | 37 | 36 |
| 9 | 41 | 38 | 36.5 | 35 | 34 |
| 10 | 45 | 42 | 42 | 44 | 43 |

The above data represent the arithmetical average of 3 to 5 individual tests.

It is apparent from the data that, in general, the adhesion at first decreases during treatment in perchlorethylene or laundering, but as the cleaning is repeated it remains virtually unchanged. This phenomenon is accordingly not to be attributed to repeated dissolution, absorption or degradation processes, but rather to a one-time change in the physical state of the polyether esters, probably due to an increase in the degree of crystallization of the initial state.

For comparison, a composition was prepared that differs from those of Examples 3 and 8 in that, instead of the 20 wt % of polyethylene glycol moieties, the same amount of polytetramethylene glycol moieties was incorporated by condensation; the relative viscosity amounted to 1.95. After application as in Examples 1 to 10 and after 5 treatments in perchlorethylene, an adhesive strength of 37.5 N/5 cm was measured. This value is still higher in the case of Example 3, and in the case of Example 8 the comparable values are virtually the same.

That even when there is only a slight change in the composition of the basic polyether ester the loss of adhesive strength in chemical cleaning can be considerable even when polyethylene glycol is incorporated is shown by the following examples which are not in accordance with the invention:

(a) Polyester prepared from 85 mol % of terephthalic acid, 15 mol % of isophthalic acid, 50 mol % of 1,4-butanediol and 1.6 hexanediol having an η rel of 1.90.
(b) Same as (a), additionally containing 11 wt % of polyethylene glycol moieties in a molar mass of 4 kg/mol with η rel=1.95.

The adhesive strengths before and after five treatments in perchlorethylene were: (a) 26 and 13 N/5 cm; (b) 30 and 18 N/5 cm.

Example 5 was varied by changing the molar ratio of terephthalic acid to isophthalic acid to 0.45:0.55; the η rel was 1.90. The initial adhesive strengths averaged 30 N/5 cm, and after 5 treatments in perchlorethylene they dropped to 15 N/5 cm.

For purposes of comparison a polyether ester was prepared which contained moieties of the following starting substances: 45 mol % of terephthalic acid, 50 mol % of isophthalic acid, 5 mol % of adipic acid, approximately 100 mol % of 1,4-butanediol and 11 mol % of moieties of polyethylene glycol with a molar mass of 4 kg/mol. The relative viscosity was 1.90. Prior to immersion in perchlorethylene the adhesive strength was about 34.6 N/5 cm, but afterward only 14.4 N/5 cm.

Lastly, a polyether ester was prepared from 80 mol % of dimethylterephthalate, 20 mol % of glutaric acid, 20 mol % of diethylene glycol and 80 mol % of 1.6-hexanediol, with a relative viscosity of 2.0. This gave an initial adhesive strength of 35 N/5 cm, which after a single treatment in perchlorethylene fell to 29.7 N/5 cm, and after 5 treatments in perchlorethylene dropped to 24 N/5 cm.

In contrast to the polyesters of the invention, these products exhibited a constant loss of adhesive strength upon repeated treatment with perchlorethylene.

It will be understood that the specification and examples are illustrative but not limitative of the present invention and that other embodiments within the spirit and scope of the invention will suggest themselves to those skilled in the art.

The polyethylene glycol is of the formula $HO(CH_2-CH_2-O)_nH$, wherein n is the degree of condensation, being 2 or 3 in case of diethylene glycol and triethylene glycol and being higher in the cases of polyethylene glycol of the average molecular weight of 400 to 6000; in other words of the molar mass of 0.4 to 6.0 kg/mol. In the polyether esters produced form the residues of the polyethylene glycol used and of the 1,4 butane diol the diol component of 100 mol % of diol residues while the residues of terephthalic acid and isophthalic acid form the acid component of 100 mol % of acid residues.

For forming the polyether ester product an excess of 1,4-butane diol is added at the beginning, while the excess distills off during the performance of the condensation, and in the case of the invention and an additional amount of 1,4-butane diol escapes, corresponding to the amount of polyethylene glycol, which is a diol, added at the beginning of the condensation process.

What is claimed is:

1. Polyether ester for the cementing of textiles comprising terephthalic acid, isophthalic acid, 1,4-butanediol and a polyalkylene ether diol, having a melting point of 95° to 125° C. and a relative viscosity, measured at 25° C. on 1 g of polyether ester in 100 ml of a mixture of 60-wt-parts of phenol and 40 wt-parts of 1,1,2,2,-tetrachloroethane, from 1.85 to 2.20, wherein the molar ratio of terephthalic acid to isophthalic acid is 48 to 55:52 to 45 having a content of 10.5 to 25 wt % of polyalkylene ether diol with a molar mass of 0.4 to 6 kg/mol, relative to the weight sum of all the residues contained in the polyether ester.

2. Polyether ester as claimed in claim 1, wherein said polyalkylene ether diol is polyethylene glycol.

3. Polyether ester as claimed in claim 1, wherein said molar ratio of terephthalic acid to isophthalic acid is 50:50.

4. Polyether ester as claimed in claim 2, wherein the molar ratio of terephthalic acid to isophthalic acid is 50:50.

5. Polyether ester as claimed in claim 1, wherein up to 10% of the weight of said polyalkylene ether diol is comprised by di- and/or tri-ethylene glycol.

6. Polyether ester as claimed in claim 1, wherein up to 10% of the weight of said polyalkylene ether diol is comprised by an alkylene ether diol of lower molecular weight, the balance being polyethylene glycol.

* * * * *